Dec. 5, 1961   J. C. JOUBLANC   3,012,236
OVERLOAD INDICATOR FOR ELECTRICAL APPARATUS
Original Filed July 30, 1956   2 Sheets-Sheet 1

INVENTOR.
Joseph C. Joublanc
BY
Fred Wirott
Attorney

Dec. 5, 1961 J. C. JOUBLANC 3,012,236
OVERLOAD INDICATOR FOR ELECTRICAL APPARATUS
Original Filed July 30, 1956 2 Sheets-Sheet 2
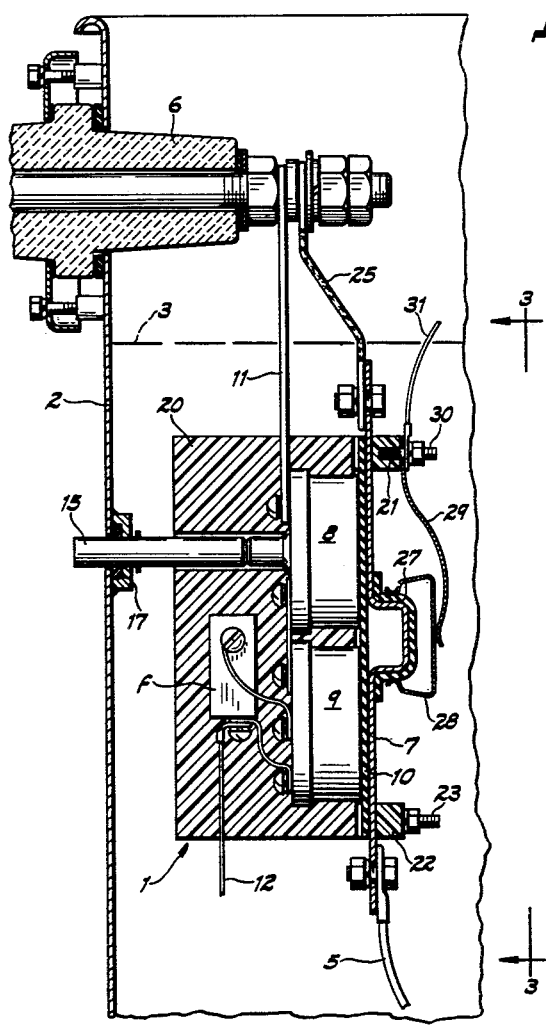
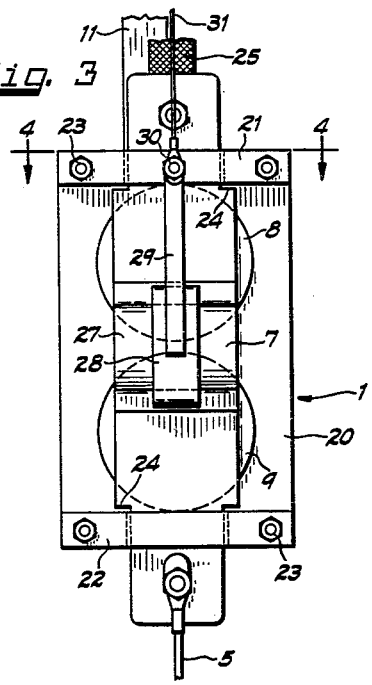
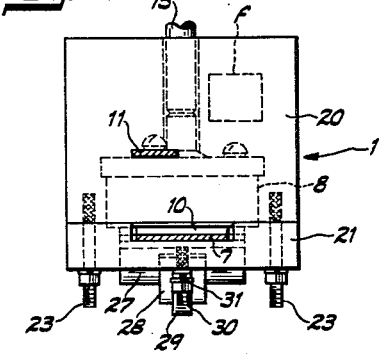
INVENTOR.
Joseph C. Joublanc
BY
Fred Wiviott
Attorney

United States Patent Office 3,012,236
Patented Dec. 5, 1961

3,012,236
OVERLOAD INDICATOR FOR ELECTRICAL APPARATUS
Joseph C. Joublanc, Zanesville, Ohio, assignor to Mc-Graw-Edison Company, a corporation of Delaware
Original application July 30, 1956, Ser. No. 600,790, now Patent No. 2,886,805, dated May 12, 1959. Divided and this application Aug. 19, 1958, Ser. No. 758,643
2 Claims. (Cl. 340—248)

This case is a division of application Serial No. 600,-790, filed July 30, 1956, now Patent No. 2,886,805, granted May 12, 1959.

This invention pertains to a device for detecting and indicating overload conditions in fluid immersed electrical apparatus such as distribution transformers and in another aspect the invention serves to indicate expiration of the normal life of insulating materials used in the apparatus.

It is commonly accepted that the expected life of organic insulating materials used in transformers depends to a large extent upon thermal conditions at the hottest spot and that deterioration of such insulation is a function of time, mechanical and dielectric stress as well as the temperature to which it is subjected. Hence, it is a frequent practice to provide transformers, particularly, with thermal responsive devices which purport to reflect conditions at the hot spot and to integrate the total effect of long and short duration overloads regardless of their magnitudes.

Such devices may be divided into three broad types. The first includes a temperature sensitive bimetallic element in heat exchange relationship with the top transformer oil and in circuit with the windings, in order to achieve delayed response to injurious long duration overloads of certain values and more rapid response to short duration overloads of greater values. By giving careful consideration to the physical characteristics of the bimetallic element, namely, its heat input, area, and losses, the bimetal may be designed so that its temperature gradient with respect to the top oil equals the gradient of the windings with respect to the top oil. Thus, regardless of ambient temperature conditions, the temperature of the bimetal will be the same as the temperature of the winding. The amount of load current required to cause the winding, and accordingly the bimetal, to reach any predetermined temperature value, is dependent upon ambient temperature conditions. That is, the load current required is high for low ambient temperatures, and low current is required for high ambient temperatures.

Because transformers of different sizes and ratings have dissimilar thermal characteristics, it is necessary that a bimetallic heat responsive element be deigned and carefully coordinated with the particular transformer to which it is applied. Thus, in order to supply the requirements of a manufacturer producing a complete range of distribution transformers, it is necessary to provide a completely individual thermal condition indicator for each transformer type and rating, under the limitations of prior art practice. It is obviously wasteful of design effort, manufacturing facilities and storage space and otherwise inconvenient to employ a wide variety of such indicators.

The second broad type of thermal condition indicator consists in a temperature responsive element in the form of either a bimetallic element or an expansion bulb in heat exchange relation with the insulating oil and including a separate electric heating coil which carries part or all of the transformer load current and is in proximity with the temperature responsive element for reflecting conditions at the hot spot during large overloads of short duration. Prior art designs of such indicators are also inflexibly adapted for use with the particular transformer ratings with which they are coordinated.

The third type of thermal indicator consists in a temperature responsive element in direct physical contact with the wire of the transformer coil. This type must be placed in the coil during winding and is usually located in the portion thereof which will reach the highest temperature under operating conditions. If the voltage on the winding is high, the temperature responsive element must be insulated to eliminate a shock hazard. There is always a possibility that failure of the insulation around the temperature responsive element will result in dangerous potentials appearing on it.

A principal object of this invention is to overcome the above noted inconveniences and economic disadvantages by providing a thermal overload indicator which includes basic components universally adaptable to a wide range of differently rated transformers and also includes less expensive interchangeable components for conveniently adapting the indicator to a particular transformer.

Another object is to provide a relatively inexpensive device capable of differentiating between various degrees of overload and emitting a corresponding signal by which the copper temperature ranges due to overload conditions may be distinguished. One form of the novel indicator is also provided with a counter for totaling the number of large magnitude overloads and providing a basis for determining when an installed transformer should be replaced by one having a larger current carrying capacity.

A further object of the invention is to provide a device which not only indicates the temperature ranges to which a transformer winding is being subjected but also anticipates impending dielectric failure of the transformer coil insulation by emitting a visible or audible signal before actual failure thereof.

More general objects of the invention are to provide an overload indicator which is inexpensive, durable, compact and easy to install. Other specific objects will appear from time to time throughout this specification.

Generally stated, the novel overload indicator is characterized by a basic universal component, adaptable to a variety of distribution transformers, and an interchangeable component for achieving adaptation to any particular transformer of given rating. The universal component consists in at least two enclosed bimetallic thermally responsive elements each having a portion of their housing projecting from a resinous or plastic embedment. The entire embedment is installed in the top transformer oil in heat exchange relationship therewith. Preferably, one of the thermal elements is of the snap acting, single pole-single throw, manual resetting type and the other is a double pole-double throw snap acting type. Both thermal elements are connected serially with each other across the secondary transformer bushings and in circuit with an indicating light exterior to the transformer tank.

The embedment also embraces a flasher which is cut in and out of the signal light circuit by selectivity of the double throw bimetal. Each bimetallic element responds to a different critical temperature so that upon closing the single pole element while the double throw element is in a first position, a steady warning signal is emitted. Whereas, if the transformer temperature increases until the double throw bimetallic element snaps to a second position, the flasher is interposed in circuit with the signal light, causing the latter to emit an intermittent, more conspicuous signal for the purpose of attracting attention to the higher, more injurious overloads.

The interchangeable components of the indicator include an electric heater detachably mounted on the resin embedment in close proximity with the two thermally responsive switches. The heater conducts all or part of the transformer's secondary current and is adapted to accelerate response of the thermal switches when the transformer is suddenly subjected to high magnitude overload currents. Different heaters are easily installed in the universal component where transformer characteristics and ratings differ.

An easily installed heat insulating barrier interposed between the heater and thermal switches constitutes the other interchangeable component of the overload indicator. The barrier is likewise selected in accordance with thermal characteristics and ratings of the transformers to which the indicator is being applied. The barrier provides a temperature gradient between the thermal switches and heater so that the said switches will have substantially the same temperature gradient with respect to the top oil as the average winding temperature to the top oil temperature.

Therefore, the heater element is a thermal image of the winding hot spot temperature; whereas, the thermal switch is a thermal image of the average winding temperature. This difference between the hot spot temperature and average winding temperature is usually in the order of 10° C. during normal operating conditions.

Those versed in the art will appreciate that the invention enables incorporation of two variables into the thermal responsive component. That is, its heat input may be varied by changing the heater resistance, and the response rate of the bimetals may be varied by changing the insulation barrier between the heater and bimetals.

A more detailed description of the invention will be set forth in connection with the following drawings in which:

FIG. 2 is an enlarged side elevational view of the overload indicator constituting the invention;

FIG. 3 is a front elevational view of the overload indicator;

FIG. 4 is a top view partly in section taken on a line corresponding with 4—4 of FIG. 3 and looking in the direction of the arrows;

Figure 1:
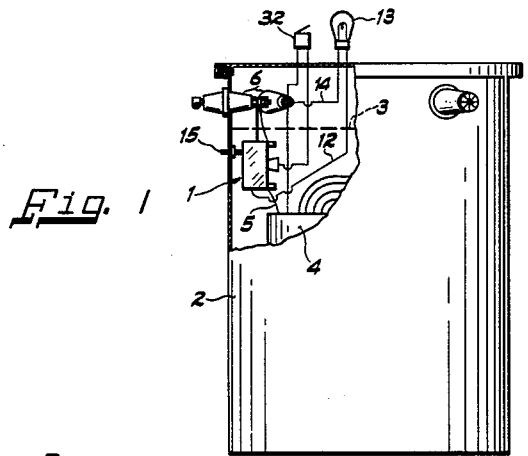
FIG. 1 is an elevational view, with parts broken away, showing a transformer embodying the invention.

In FIG. 1, the novel overload indicator is designated generally by the reference numeral 1 and shown immersed in an insulating fluid such as oil partly filling a transformer tank 2 to a level indicated by the dashed lines 3. A transformer core and coil assembly 4, whose thermal condition the invention is intended to indicate, is also under oil within the tank. Indicator 1 and core and coil assembly 4 are in mutual heat exchange relation through the oil medium.

Figure 6:
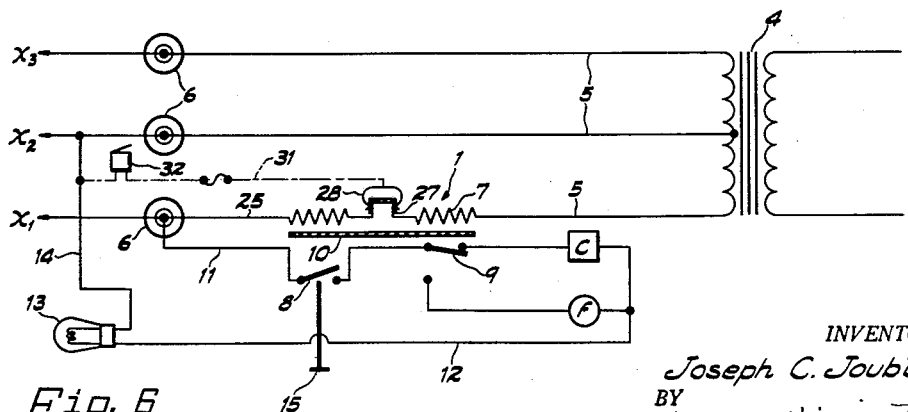
FIG. 6 is a schematic representation of the invention associated with a transformer.

Before entering into a detailed discussion of overload indicator 1, reference is made to FIG. 6 where the indicator and the equipment with which it is associated are shown diagrammatically for convenient consideration. Transformer 4 is a well known dual voltage secondary type of distribution transformer having secondary leads 5 connected for three wire service, supplying an electrical load through tank insulating bushings 6. One of the lead wires 5 has connected in it a heater element 7 associated with indicator 1. In proximity with heater 7 and also being part of the indicator is a pair of bimetallic thermostatic switches 8 and 9. Switch 8 is a single pole, single throw, manually resettable, snap acting, temperature responsive switch, hereinafter called a S.P.S.T. switch. Switch 9 is a single pole, double throw, snap acting, self resetting temperature responsive switch, hereinafter called a S.P.D.T. switch. Switches 8 and 9 are serially connected in a signal circuit to be described.

In order to obtain the most satisfactory indication of overload conditions in a transformer connected for three wire service, see FIG. 6, where in some instances overload current may be supplied through lines $X_1$ and $X_2$ or $X_2$ and $X_3$ only, a second set of bimetallic elements 8, 9, a heater element 7, and a flasher $f$ and counter unit $c$ if the latter is desired, must be inserted in the secondary lead 5 which is connected to bushing $X_3$. Since the suggested circuit is symmetrical with that of FIG. 6 it is not shown, for the sake of brevity, but it is deemed readily understandable by those versed in the art.

Interchange of heat between switches 8, 9 and the transformer oil and heater 7 is controlled by a readily interchangeable thermal barrier 10 interposed between them. The thermal characteristics of insulating barrier 10 will determine the rate at which the thermal elements in switches 8 and 9 will reach the temperature value of the heater element 7. According to conventional analysis, this rate is dependent upon the barrier's coefficient of conductivity K, its area, thickness and the temperature difference over the thickness of barrier 10. Where K is expressed in calories per second per degree centigrade per centimeter, the rate of heat transfer through barrier 10 will be equal to $Kdt/dsA$, where A is area and the differential is that of temperature difference with respect to time. Hence, the thermal lag of bimetal switches 8, 9 with respect to heater 7 can be changed to meet requirements of a particular transformer design by merely changing the character of the barrier material 10 as indicated. Expressed in another way, the novel indicator can duplicate the gradient of a large number of transformer coil temperature gradients, by changing, in effect, the heat transfer coefficient of the barrier and/or the heat output of the heater element by changing resistivity of the latter.

The signal circuit commences at the left hand bushing 6 in FIG. 6 with a low voltage supply lead 11 in the form of a metal embedment supporting bar connected to the series switches 8, 9. A pair of wires connect to alternate terminals of S.P.D.T. switch 9 and include a counter $c$, which is optional, and an intermittent switch such as flasher $f$. Output leads of the counter and flasher join in a common wire 12 extending to a signal light 13 which is located exterior to transformer tank 2 and visible a considerable distance therefrom. Signal light 13 connects to the middle low voltage bushing 6 by means of a lead wire 14.

In FIG. 6, it may be assumed that the transformer 4 is conducting a tolerably safe load whereupon its oil temperature rise is such that switch 8 is open and S.P.D.T. switch 9 is closed in the first of its selective positions. Under these conditions signal light 13 is deenergized or dark. If the load is increased so that the temperature of the transformer copper rises to a value which increases deterioration of the transformer insulation, then S.P.S.T. switch 8 closes and signal light 13 emits a steady glow. This condition is indicated graphically on the typical copper temperature vs. time with varying load curve of FIG. 5 at point $a$. If the temperature of the transformer drops to a safe value, however, switch 8 will remain closed until manually opened by means of a reset button 15 reachable from the exterior of the transformer tank 2.

If the overload continues to increase until the transformer temperature reaches a critically injurious value, switch 8 remains locked in and S.P.D.T. switch 9 snaps to its alternate position in response to the increased temperature, whereupon it interposes flasher $f$ in series with signal light 13. The light then emits a more conspicuous intermittent signal announcing that the transformer is critically overloaded.

Figure 5:
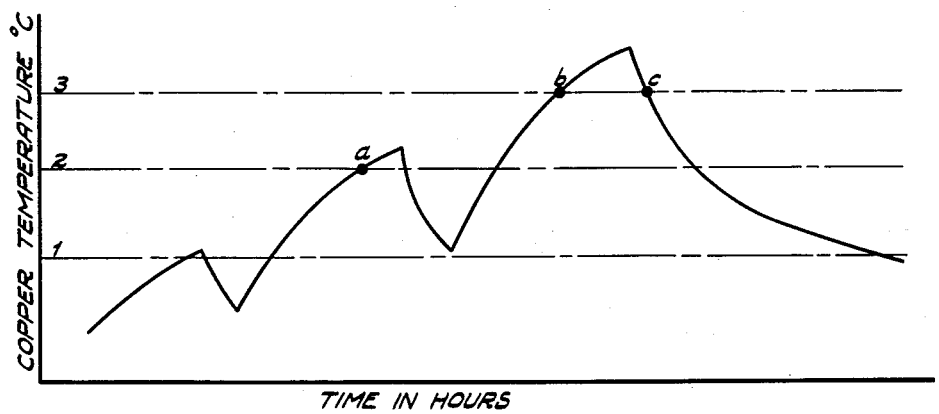
FIG. 5 is a graph depicting the operating characteristic of the invention.

The last described condition is indicated graphically in FIG. 5 at the point $b$ on the curve. If the critical overload continues for a period of time and then subsides to a level below point $c$, S.P.D.T. switch 9 will snap back to its first position and eliminate the flasher $f$ from the light 13 circuit. Light 13 will then continue to emit a steady glow until reset by button 15.

Counter $c$ is an optional feature of the novel indicator. It may be located exterior to transformer tank 2 for conveniently checking the total number of seriously injurious overloads which the transformer has undergone, so its use is recommended. The counter may be any commercially available type which advances one numeral each time it is energized. As employed here it would advance when the transformer is cooling, which means when S.P.D.T. temperature responsive switch snaps back to its position in FIG. 6.

The inventive overload indicator may also be provided with means for subjecting a sample piece of transformer insulation to thermal, mechanical and dielectric stresses comparable with those to which the actual transformer insulating material is subjected. Explaining this attribute of the invention will be deferred until later.

Attention is now invited to FIGS. 2, 3, and 4 showing the specific character of the indicator. Note that switches 8, 9, flasher *f*, strip 11 and push button 15 together constituting the universal component of the indicator 1, are embedded in a solid prism of resinous material 20. Lead strip 11 is preferably of copper and not only performs as part of the signal circuit but affords a very convenient means for supporting the indicator from studded bushing 6, no special mounting means being required.

The interchangeable components of indicator 1, namely, heater strip 7 and thermal insulation barrier 10, are secured against switches 8 and 9 by means of upper and lower clamps 21 and 22, which are held by knurled studs 23 cast firmly in resinous embedment 20.

Heater strip 7 may be made of a relatively poorly conductive material such as stainless steel or in thinner strip of more conductive material such as copper. In any case, heater 7 will be designed so that its heating capacity and output will bear a proportionality to the heating conditions in the vicinity of the transformer's hottest spot. In this illustrative embodiment, heater strip 7 is formed with shoulders 24 interposed closely between clamps 21 and 22 so that the strip cannot slip vertically. One end of heater 7 is conveniently connected to a secondary bushing 6 by a lugged pigtail 25 and the other end is connected directly to a secondary winding lead wire 5. It will also be noted that one of the broader surfaces of heater 7 is in direct heat exchange relationship with the top transformer oil and the other is in the same relationship with thermal insulating barrier 10.

Thermal barrier 10 may have a configuration similar to that of heater 7 except that no extension for connecting lead wires is necessary. Since the barrier 10 controls the rate of heat flow from the top oil and heater 7 to the thermal switches 8 and 9, it may be composed of temperature resistant plastic, glass cloth, insulating paper, the top oil itself or a combination of these elements. Although it is a significant attribute of this disclosure that the heater 7 and thermal barrier 10 be readily interchangeable with respect to the basic components carried by the embedment 20, it is also within the scope of the invention to embed either or both the barrier and heater.

As explained earlier, the fundamental idea of an overload indicator such as that under consideration is to reflect conditions at the transformer hot spot and to account for the fact that the allowable overload magnitude is a function of the time during which it is applied. During periods of normal transformer operation a definite temperature gradient between the hot spot and top oil will be established at which time switches 8 and 9 do not close the signal circuit. However, if the transformer is suddenly called upon to deliver an increased load, the hot spot and heater 7 temperatures will increase very rapidly, but the temperature of the top oil will lag behind. By selecting an insulating barrier 10 having proper heat transfer characteristics, the time constant of the bimetallic switches 8 and 9 will be such that they will attain their response temperatures after a time delay, if they ever attain it at all. Under these circumstances the top oil temperature continues to rise exponentially and ultimately causes switches 8 and 9 to respond in order and energize signal lamp 13. If the overload drops off in a period of time not exceeding that in which the transformer insulation life loss becomes excessive, the switches will never attain their operating temperatures. The temperature of switches 8 and 9 will then decline in accordance with the hot spot temperature. The aforegoing sequence of events is illustrated graphically in FIG. 5 where the point "*a*" on the curve indicates the temperature conditions under which switch 8 causes a steady light to be emitted by signal 13, point "*b*" the condition where switch 9 closes to cause an intermittent signal to be emitted, and point "*c*" the condition where switch 9 opens the flasher circuit and causes the counter *c* to operate. As explained earlier, it is desirable, though not indispensable, that switch 8 controlling the steady signal light be manually reset to open position by means such as push button 15.

Further reference to FIG. 2 reveals that reset button 15 may extend from thermal switch 8 outward of tank 2 through any conventional fluid sealing gland like 17 so that button 15 may be reached exteriorly of the tank. Obviously, it is within the ability of a skilled artisan to actuate the reset button by means of linkage, not shown, passing out of tank 2 above oil level 3.

Plastic embedment 20 may also be modified by inclusion of holes which do not unduly weaken it, yet allow oil to circulate therethrough. In this manner, the thermal characteristics of the indicator may be further altered.

The novel overload indicator also features means for indicating impending dielectric failure of the organic insulating materials of the transformer. This is accomplished by subjecting a properly chosen sample piece of insulating material to the same dielectric and thermal stresses per unit area as comparable insulation at the hot spot. For this purpose a sample piece of insulation 27, see FIG. 2, is held on an offset portion 7a of heater strip 7. Sample 27 is exposed to the heating influence of strip 7 and the top oil and is held in place by a U-shaped spring clip 28 of conductive material such as beryllium copper. A pressure finger 29 bears on spring clip 28 and is anchored on a terminal bolt 30 where it connects to a lead wire 31 from a warning buzzer coil 32, see FIG. 6. The opposite side of the buzzer coil 32 connects to one side of the transformer secondary by means of lead 14 joined to a bushing 6. Hence, spring clip 28 acts as an electrode supplied by one secondary line and heater coil 7 acts as another electrode by virtue of it being connected to an opposite secondary line through pigtail 25. The two electrodes thus subject sample insulation 27 to substantially the same potential stress as is the insulation between the layers of the transformer winding. When sample 27 deteriorates to such extent that it is incapable of insulating properly, it will break down electrically so as to complete the circuit through warning buzzer 32. As a result of proper coordination, this gives an audible signal that failure of the transformer insulation is near at hand.

Lead 31, illustrated in this preferred embodiment as a dashed line leading to the buzzer coil 32, may also be connected directly to a terminal of signal light 13 if it is desired to eliminate buzzer 32. With this circuit it is possible to determine if signal light 13 is lit by closure of thermal switches 8 and 9 due to overload or by rupture of insulation sample 27 due to dielectric failure by depressing reset button 15. If reset button 15 does not extinguish light 13 it may be assumed that failure of the insulation sample, warning of impending transformer insulation failure, is the cause of the signal.

If the potential between beryllium spring clip 28 and heater 7 is, for example, 120 volts, then if sample insulation 27 were .005 inch thick, it would be dielectrically stressed to 24 volts per mil. Preferably, this would be a little greater stress than that applied to the actual transformer insulation so that the sample would break down first. For design purposes the heat per unit area can be calculated and the size of insulation sample 27 and/or the heating element 8 can be made to simulate coil conditions.

Since different manufacturers stress their transformer insulation dielectrically through a range of approximately 20 to 50 volts per mil. insulation thickness, it is obvious that the sample insulation for a particular brand of transformer will have to be selected with that in mind. Once the dielectric stress on a given transformer coil insulation is known, it is a simple matter to adapt the indicator to that manufacturer's product by choosing a sample of comparable insulating material to be slightly overstressed electrically.

The invention also simulates the mechanical stress to which the transformer winding insulation is subjected by means of the bearing pressure exerted on the sample insulation by the spring clip 28. Thus the invention closely approaches actual conditions which combine to cause insulation failure in a transformer, that is, by simulating the electrical stress and the mechanical stress which the insulation undergoes in the transformer winding.

The immediately aforegoing feature of this invention is an improvement over U.S. Patent No. 2,457,879, assigned to the assignee of the instant invention, disclosing an insulation age indicator which relies purely upon mechanically stressing a sample piece of insulation subjected only to the temperature and deteriorating influence of the transformer oil in which it is immersed.

Although only a preferred embodiment of the invention has been shown for facilitating description of its general features, the disclosure is to be construed as illustrative rather than limiting for the invention may be variously embodied and is to be interpreted as claimed.

It is claimed:

1. In combination, a load and insulation condition indicator for a transformer immersed in dielectric fluid, a pair of transformer secondary terminals, said load indicator including a heater element in circuit with a secondary winding of said transformer and one of said terminals, an insulation sample means simultaneously exposed to the heat of said element and to said fluid and to the electrical potential between terminals, said heater element generating heat in accordance with the secondary current in said transformer and establishing a temperature gradient with respect to said dielectric fluid proportional to the gradient between the transformer hot spot and said dielectric fluid, signal means connected between the other of said terminal and said one terminal and normally deenergized by said insulation sample means, whereby dielectric failure of said sample means will indicate substantial expiration of said transformer insulation by passing sufficient leakage current to energize said signal means.

2. In combination, a load and insulation condition indicator for a transformer immersed in a dielectric fluid, a pair of transformer secondary terminals, said load indicator including a heater element in circuit with a secondary winding of said transformer and one of said terminals, an insulation sample disposed between two electrodes and simultaneously exposed to the heat of said element and to said fluid, said heater element generating heat in accordance with the secondary current in said transformer and establishing a temperature gradient with respect to said dielectric fluid proportional to the gradient between the transformer hot spot and said dielectric fluid, means for applying an electrical potential to said electrodes equal to that which exists between said terminals, one of said electrodes comprising spring clip means which subjects said insulation sample to the mechanical stress existing in said transformer insulation, and signal means connected between the other of said terminals and said one terminal and normally open circuited by said insulation sample means, whereby dielectric or mechanical failure of said sample means will indicate substantial expiration of said transformer insulation by allowing sufficient current to pass between said electrodes to energize said signal means.

References Cited in the file of this patent

UNITED STATES PATENTS

| | | |
|---|---|---|
| 2,175,893 | Hill | Oct. 10, 1939 |
| 2,313,975 | Spear et al. | Mar. 16, 1943 |
| 2,457,879 | Earle | Jan. 4, 1949 |
| 2,567,921 | Boehm | Sept. 18, 1951 |

OTHER REFERENCES

Satterlee: AIEE Technical paper 52–88, 11 pages, January 1952.